(12) United States Patent
Baek

(10) Patent No.: US 10,690,807 B2
(45) Date of Patent: Jun. 23, 2020

(54) ENVIRONMENTAL SENSOR APPARATUS

(71) Applicant: Neo Mobile Technology Inc., Yongin-si, Gyeonggi-do (KR)

(72) Inventor: JaeGu Baek, Suwon-si (KR)

(73) Assignee: NEO MOBILE TECHNOLOGY INC., Yongin-sim Gyeonggi-do (KR)

( * ) Notice: Subject to any disclaimer, the term of this patent is extended or adjusted under 35 U.S.C. 154(b) by 149 days.

(21) Appl. No.: 16/101,657

(22) Filed: Aug. 13, 2018

(65) Prior Publication Data
US 2019/0056528 A1 Feb. 21, 2019

(30) Foreign Application Priority Data
Aug. 18, 2017 (KR) .................. 10-2017-0104910

(51) Int. Cl.
| | | |
|---|---|---|
| G01W 1/02 | (2006.01) | |
| G01W 1/10 | (2006.01) | |
| G01W 1/11 | (2006.01) | |
| G01W 1/12 | (2006.01) | |
| G01D 11/30 | (2006.01) | |
| G01J 5/02 | (2006.01) | |
| G01K 1/14 | (2006.01) | |
| G01J 5/06 | (2006.01) | |

(52) U.S. Cl.
CPC .............. *G01W 1/02* (2013.01); *G01D 11/30* (2013.01); *G01J 5/02* (2013.01); *G01K 1/14* (2013.01); *G01W 1/10* (2013.01); *G01W 1/11* (2013.01); *G01W 1/12* (2013.01); *G01J 2005/065* (2013.01); *G01W 2201/00* (2013.01)

(58) Field of Classification Search
None
See application file for complete search history.

(56) References Cited

U.S. PATENT DOCUMENTS

| | | | | |
|---|---|---|---|---|
| 8,513,605 | B2 * | 8/2013 | Beratan | ............... G01J 1/02 250/338.4 |
| 10,197,892 | B2 * | 2/2019 | Nakano | ............... G01K 1/14 |
| 2009/0245324 | A1 * | 10/2009 | Sunaga | ............ B60H 1/00792 374/142 |
| 2011/0265840 | A1 * | 11/2011 | Sela | ............... G01J 1/18 136/244 |

FOREIGN PATENT DOCUMENTS

| | | | |
|---|---|---|---|
| JP | 2001-077560 A | 3/2001 | |
| JP | 2015-210132 A | 11/2015 | |
| KR | 20-2015-0003876 U | 10/2015 | |
| KR | 10-2017-0014343 A | 2/2017 | |
| KR | 20170014343 A * | 2/2017 | ............ G01J 1/42 |

\* cited by examiner

*Primary Examiner* — Natalie Huls
*Assistant Examiner* — Jermaine L Jenkins
(74) *Attorney, Agent, or Firm* — Rabin & Berdo, P.C.

(57) ABSTRACT

Disclosed is an environmental sensor apparatus in which a plurality of light shielding plates including an insertion space portion providing an insertion space of the circuit board and a guide portion guiding the insertion of the circuit board to the inner surface of the insertion space portion are stacked, and a circuit board is mounted inside a light shielding portion in which the plurality of light shielding plates are stacked.

8 Claims, 12 Drawing Sheets

ENVIRONMENTAL SENSOR APPARATUS

BACKGROUND OF THE INVENTION

1. Field of the Invention

The present invention relates to an environmental sensor apparatus and more particularly, to an environmental sensor apparatus used for weather observation.

2. Description of the Related Art

An environmental sensor apparatus, which is one of weather observation equipment, is called a radiation shield by minimizing the influence of solar radiation and providing an observation environment to protect the environmental sensor from rain and snow.

Korean Patent Laid-Open No. 10-2017-0014343 relates to an apparatus for weather observation, which includes a solar light module, a weather observation module, a battery, a module thermometer, and a controller. The weather observation module includes a temperature and humidity sensor portion, a mounting bracket, and a radiation shielding portion.

The weather observation module and the controller are disposed at separate positions, the weather observation module and the controller are electrically connected to each other through a probe type signal line, and the battery is disposed around the controller to supply a driving power source of the controller or the temperature and humidity sensor portion.

However, since a separate case is required to stably provide an electrical operation of the controller and prevent a short circuit or an electric leakage, there is a problem in that the installation time and cost of the apparatus for weather observation are increased.

SUMMARY OF THE INVENTION

The present invention has been made in an effort to provide an environmental sensor apparatus in which a circuit board is disposed inside a light shielding portion in which a plurality of light shielding plates are stacked.

An exemplary embodiment of the present invention provides an environmental sensor apparatus including: a light shielding portion in which a plurality of light shielding plates are stacked; a bracket formed below the light shielding portion to fix the light shielding portion; and an environmental sensor portion disposed inside the light shielding portion, and further including: a circuit board which is connected in circuit with the environmental sensor portion, in which the light shielding plate includes an insertion space portion providing an insertion space of the circuit board and a guide portion guiding the insertion of the circuit board to the inner surface of the insertion space portion, and the circuit board is mounted inside the light shielding portion.

DETAILED DESCRIPTION OF THE PREFERED EMBODIMENTS

Figure 1:
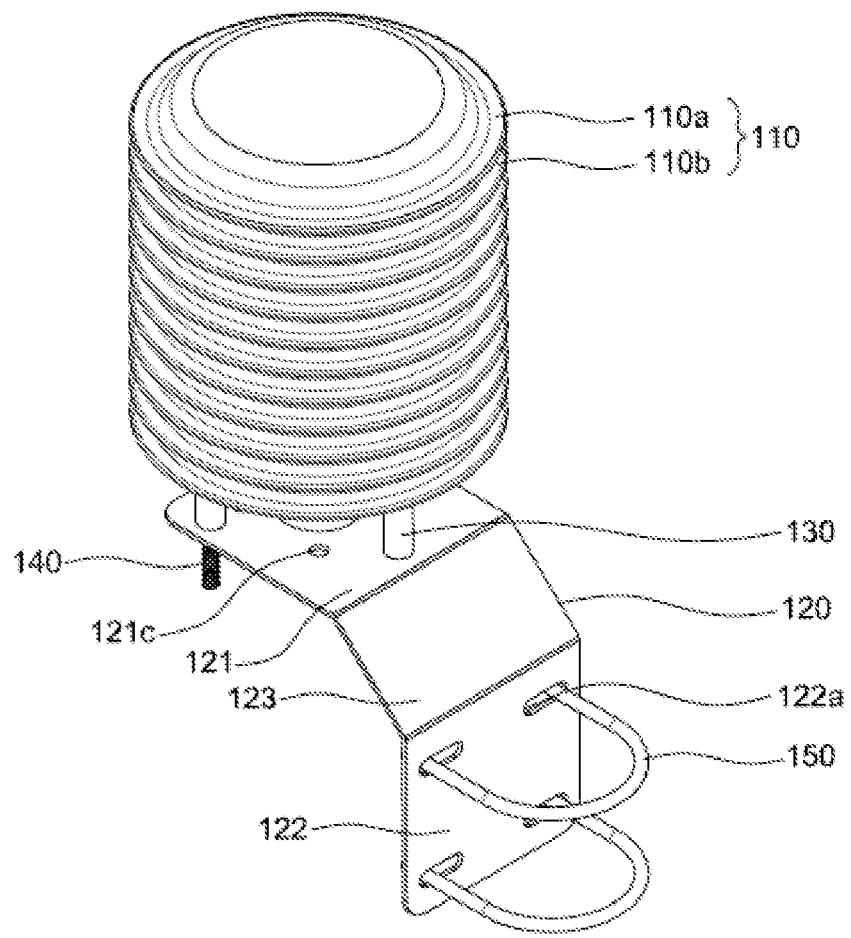
FIG. 1 is a perspective view of an environmental sensor apparatus according to an exemplary embodiment of the present invention.
Figure 2:
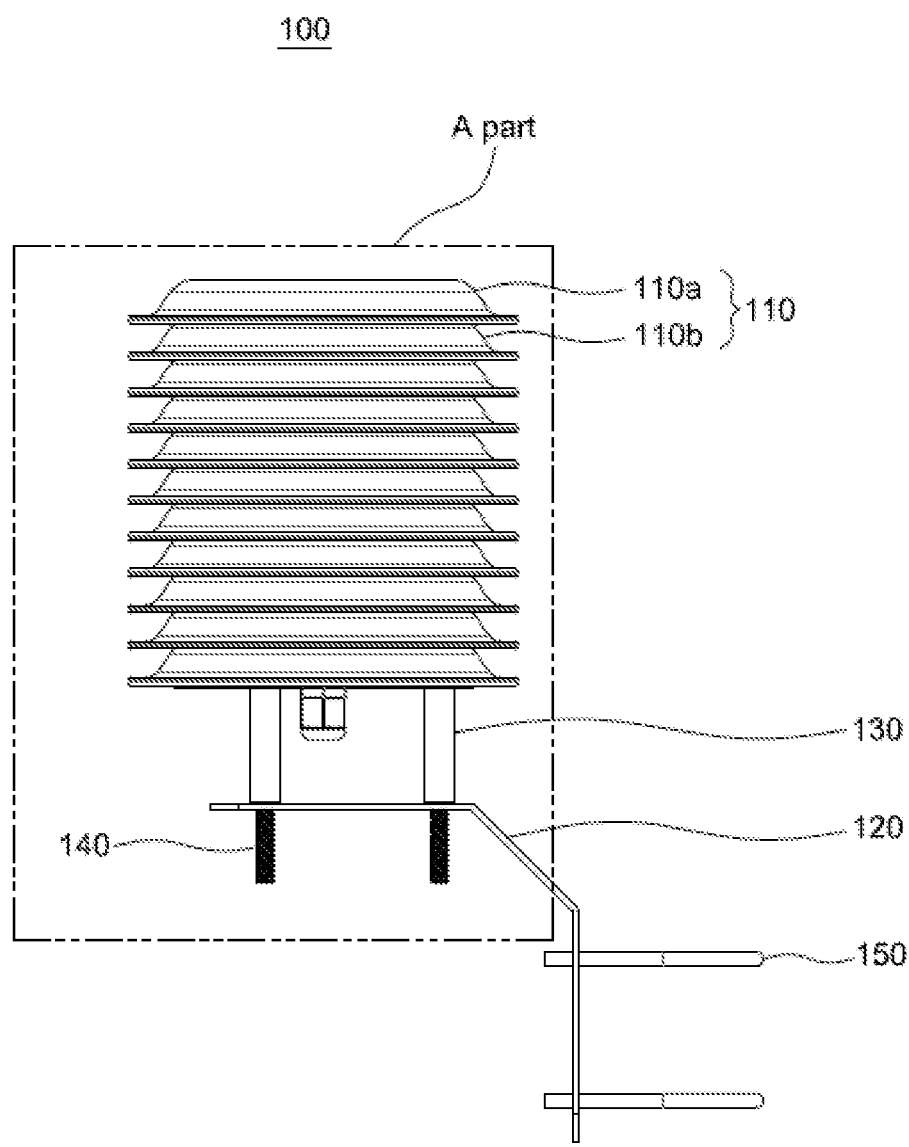
FIG. 2 is a side view of the environmental sensor apparatus according to the exemplary embodiment of the present invention.
Figure 3:
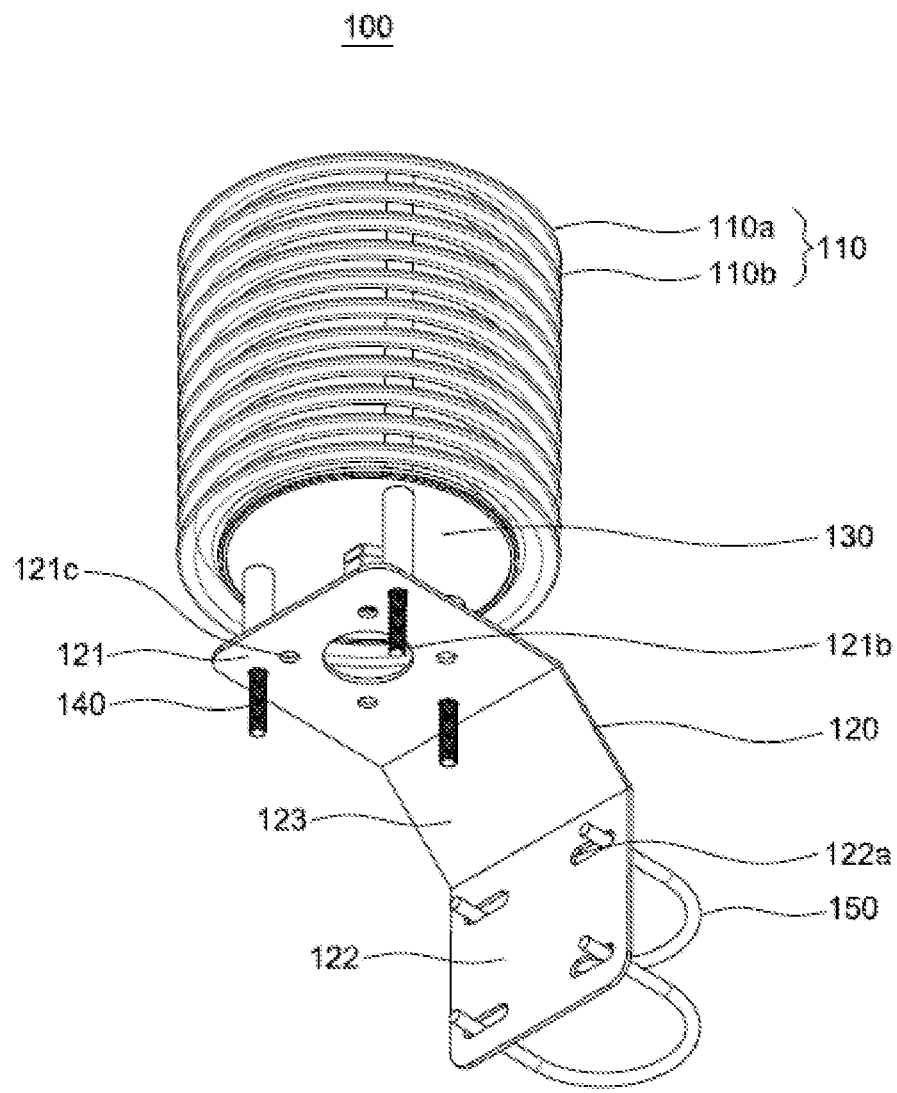
FIG. 3 is a bottom perspective view of the environmental sensor apparatus according to the exemplary embodiment of the present invention.
Figure 4:
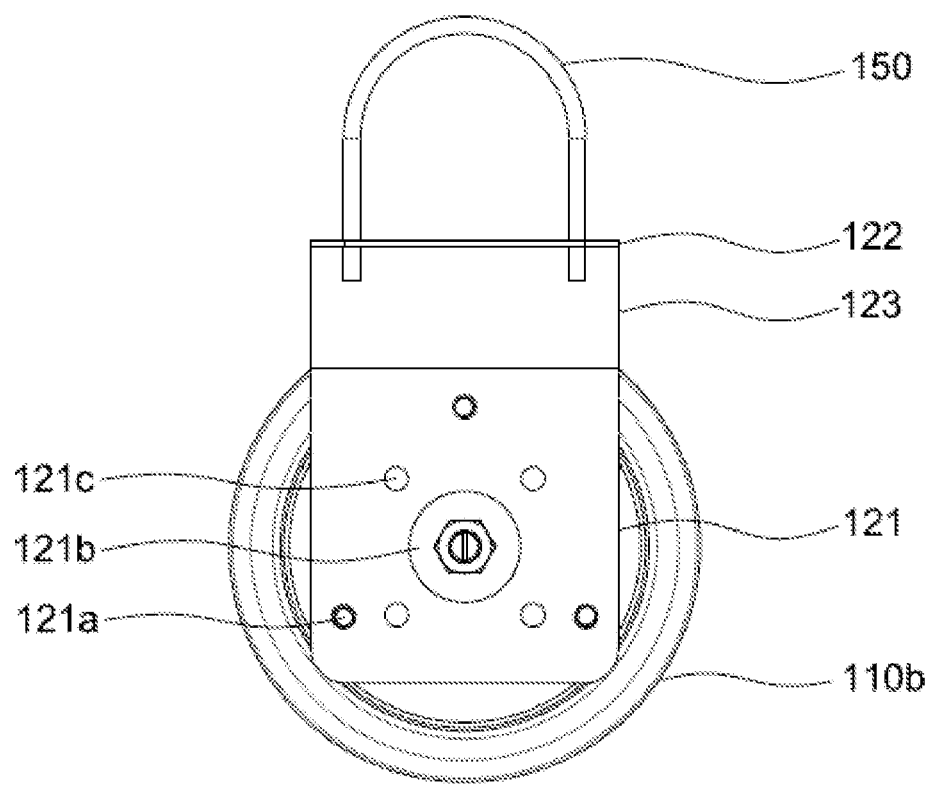
FIG. 4 is a plan view of the environmental sensor apparatus according to the exemplary embodiment of the present invention.
Figure 5:
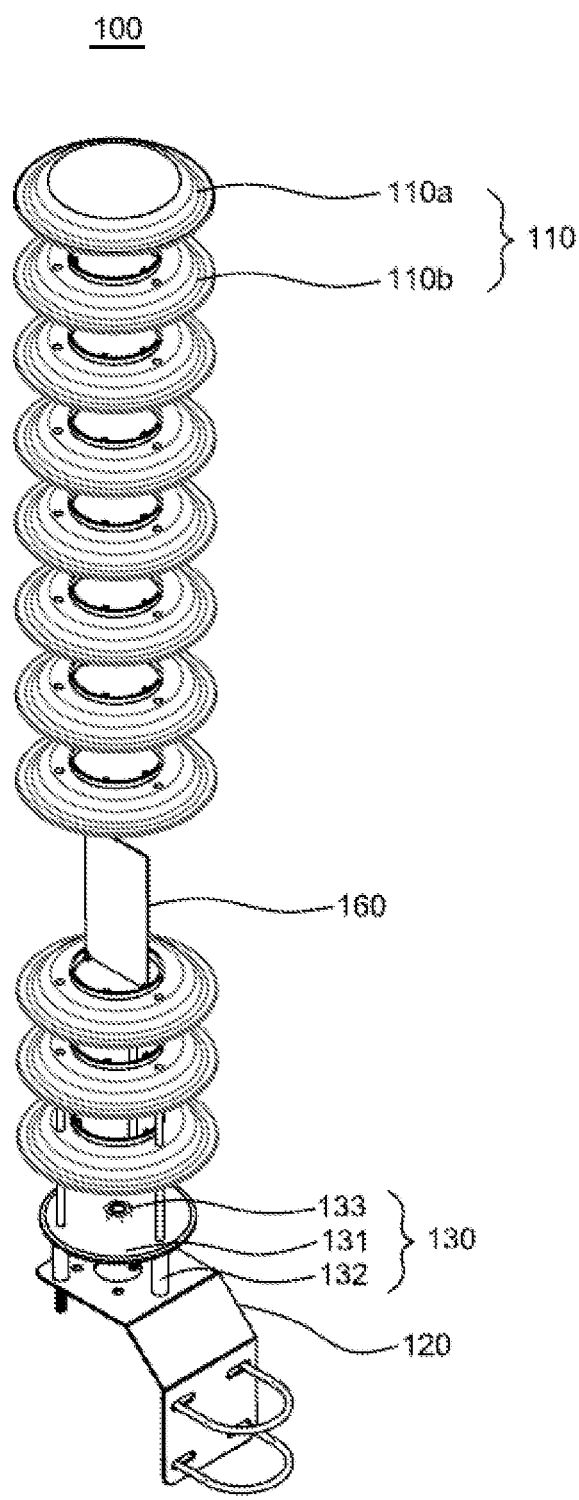
FIG. 5 is an exploded perspective view of the environmental sensor apparatus according to the exemplary embodiment of the present invention.

An environmental sensor apparatus 100 as an apparatus used for weather observation includes a light shielding portion 110, a bracket 120, and an environmental sensor portion (not shown).

The light shielding portion 110 includes a plurality of light shielding plates stacked, the bracket 120 is formed below the light shielding portion 110 to fix the light shielding portion 110, and the environmental sensor portion is disposed inside the light shielding portion 110.

The light shielding portion 110 may be made of an ABS material and prepared by applying UV coating together with painting for enhancing the esthetics of the appearance. Also, the light shielding portion 110 may be prepared by a preparing method in which the production process is simplified by including a plastic material having UV resistance.

The light shielding plate may include one light shielding upper plate 110a and a plurality of light shielding main plates 110b, and the environmental sensor portion may be a temperature and humidity sensor and various sensors used for weather observation, but the present invention is not limited thereto.

The bracket 120 includes a first bracket 121, a second bracket 122, and a connecting member 123. The first bracket 121 is used to fix the light shielding portion 110, the second bracket 122 is used to be fixed to a wall surface of a pillar, and the connecting member 123 is formed between the first bracket 121 and the second bracket 122 to provide different mounting angles of the first bracket 121 and connect the first bracket 121 and the second bracket 122.

The first bracket 121 includes a first insertion hole 121a, a second insertion hole 121b, and a third insertion hole 121c. A plurality of first insertion holes 121a are formed for firmly fixing the light shielding portion 110 to insert an assembling member 140.

The assembling member 140 includes a fixing pin with or without a thread. For example, the assembling member 140 may be a bolt and a nut. The light blocking plates 110a and 110b also include assembling holes 116 and assembling protrusions 117 for inserting the assembling member 140.

The second insertion hole 121b is to insert a probe, and the probe performs at least one of a function of receiving the environment sensor portion, a function of supplying external power to the circuit board 160, a function of supplying power of the battery 162 attached to the circuit board 160 to an external sensor portion, and a function of transmitting and receiving data when being connected with the external sensor portion. For example, in an emergency, the probe receives the external power to supply the received external power to the controller of the circuit board 160 or receives the power of the battery 162 to supply the received power to the external sensor portion.

The external sensor portion includes at least one of a temperature and humidity sensor, a solar radiation sensor, a condensation sensor, a soil moisture sensor, a wind speed sensor and a rainfall amount sensor, but the present invention is not limited thereto.

The third insertion hole 121c may be an insertion hole of a fixing device for attaching other devices to the outside, and the other devices may be an external battery, an external additional controller, or an additional external sensor portion.

The second bracket 122 includes a plurality of mounting holes 122 to be firmly fixed to a wall surface or a pillar and is fixed by the mounting member 150.

The environmental sensor apparatus 100 of the present invention includes a cover portion 130 disposed between the light shielding portion 110 and the bracket 120 to cover the lower portion of the light shielding portion 110. The cover portion 130 is similar to a function to the component of the first bracket 121.

The environmental sensor apparatus 100 of the present invention further includes a circuit board 160 that is circuit-connected with the environmental sensor portion.

Figure 7:
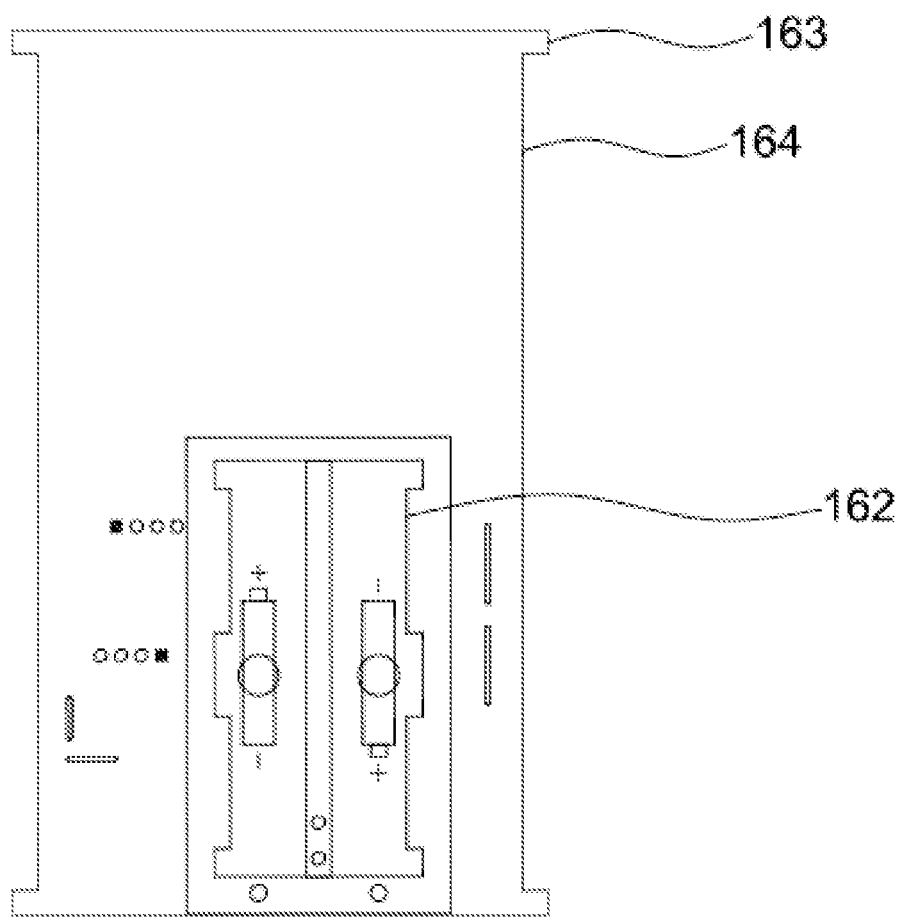
FIG. 7 is a front circuit board of the environmental sensor apparatus according to the exemplary embodiment of the present invention.
Figure 8:
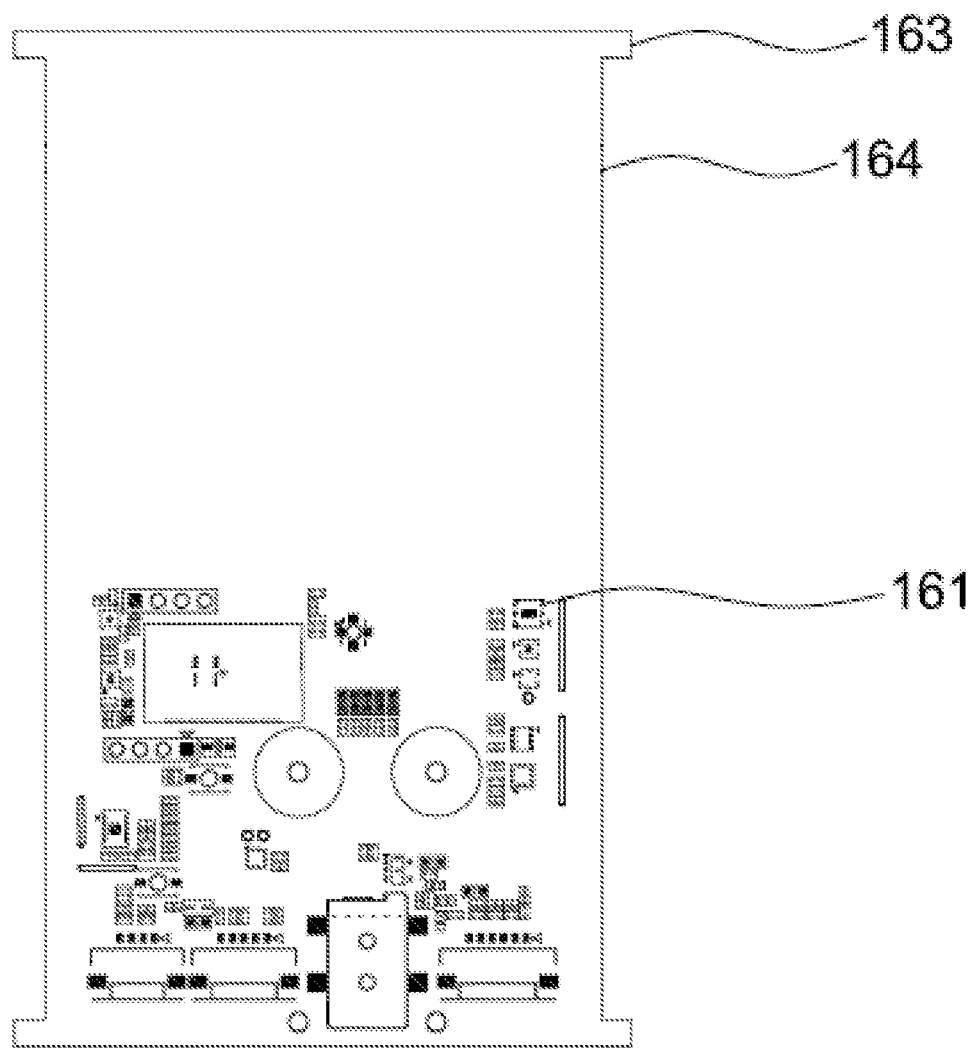
FIG. 8 is a rear circuit board of the environmental sensor apparatus according to the exemplary embodiment of the present invention.

FIGS. 7 and 8 are examples showing the circuit board, in which FIG. 7 is an example showing a front surface of the circuit board and FIG. 8 is an example of a rear surface of the circuit board.

The light shielding main plate 110b includes an insertion space portion 111 for providing an insertion space of the circuit board 160 and a guide portion 114 for guiding insertion of the circuit board 160 on the inner surface of the insertion space portion 111, and the circuit board 160 is mounted inside the light shielding portion 110.

In the present invention, the circuit board 160 is disposed inside the light shielding portion 110 and thus a separate case which prevents damage to the circuit board 160 is not required, thereby reducing installation time and cost of the environment sensor apparatus 100.

The circuit board 160 is a printed circuit board and is attached with a controller (not shown) to perform a function of the controller, and may be electrically connected to the probe. The circuit board 160 is attached with at least one of the environmental sensor portion 161, an antenna (not shown), and the battery 162. For example, the battery 162 of an AA cell×2 type may be attached to the front surface of the circuit board 160, and the environmental sensor portion 161 may be attached to the rear surface of the circuit board 160, but the present invention is not limited thereto.

The circuit board 160 may receive the power of the battery 162 or receive the external power through the probe. Also, the circuit board 160 may perform data transmission and reception through the antenna or the probe.

Figure 9:
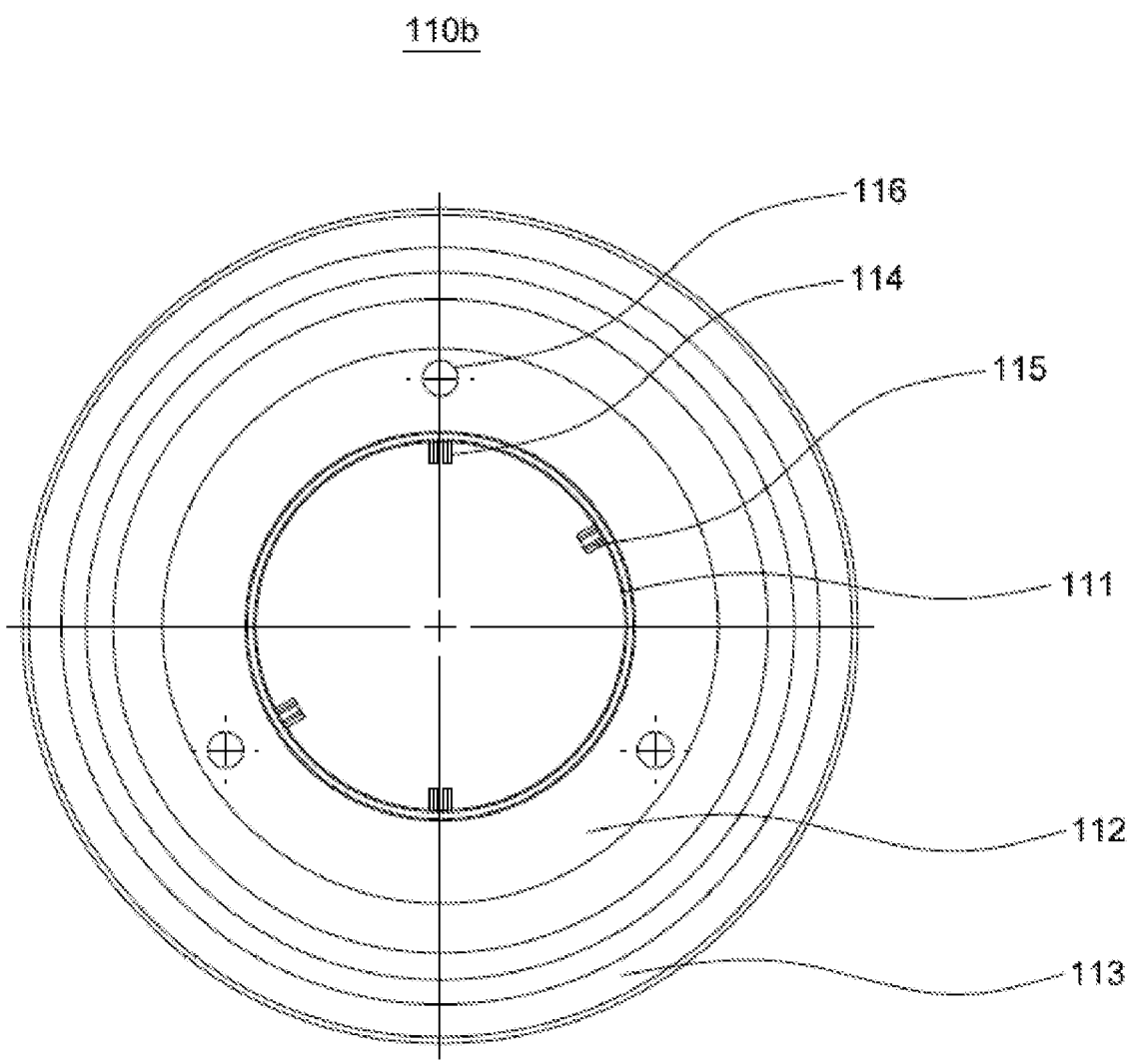
FIG. 9 is a plan view of a light shielding main plate according to the exemplary embodiment of the present invention.
Figure 10:
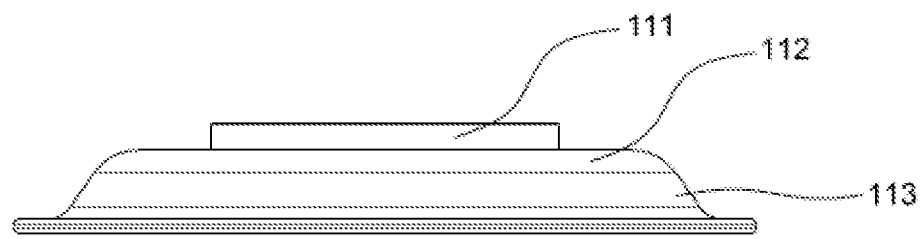
FIG. 10 is a side view of the light shielding main plate according to the exemplary embodiment of the present invention.
Figure 11:
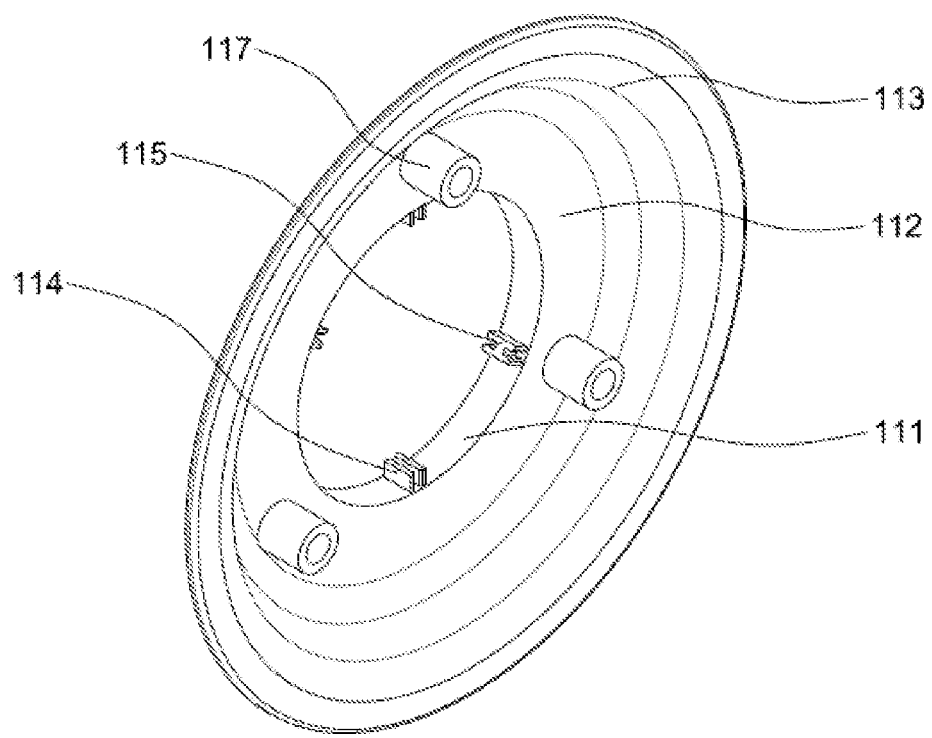
FIG. 11 is a bottom perspective view of the light shielding main plate according to the exemplary embodiment of the present invention.
Figure 12:
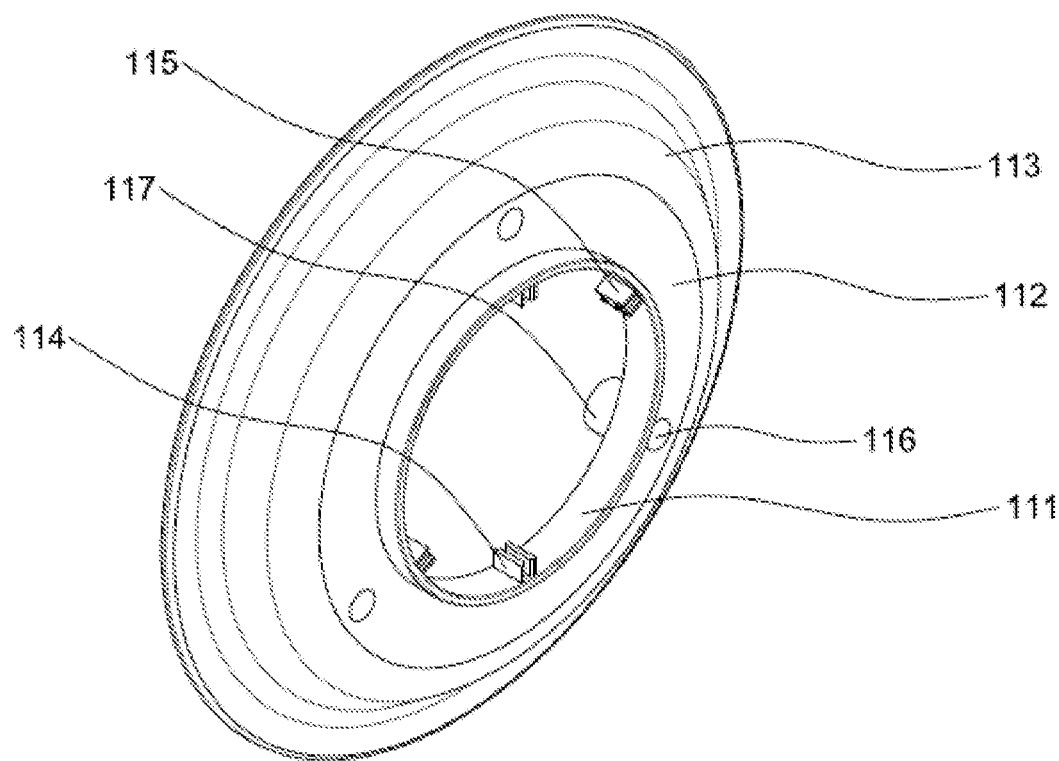
FIG. 12 is a perspective view of the light shielding main plate according to the exemplary embodiment of the present invention.
Figure 13:
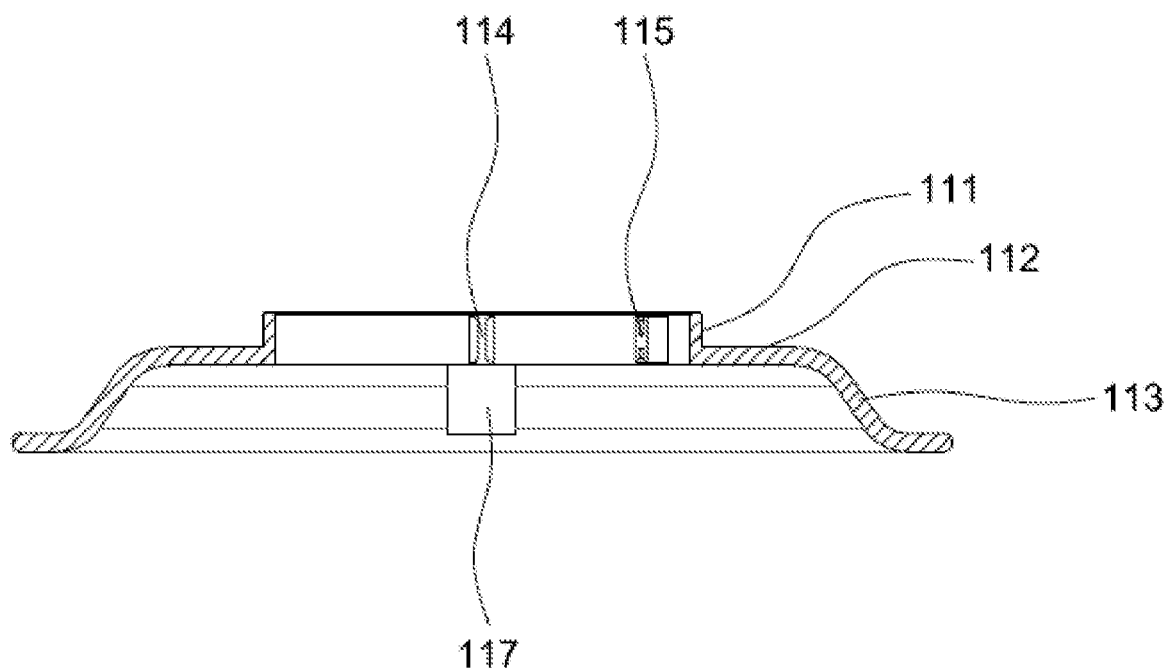
FIG. 13 is a cross-sectional view of the light shielding main plate according to the exemplary embodiment of the present invention.

FIGS. 9 to 13 are examples showing the light shielding main plate, in which FIG. 9 is a plan view of the light shielding main plate 111b, FIG. 10 is a side view thereof, FIG. 11 is a bottom perspective view thereof, FIG. 12 is a perspective view thereof, and FIG. 13 is a cross-sectional view thereof.

The light shielding plate includes one light shielding upper plate 110a having a cover surface instead of the insertion space portion 111 and the guide portion 114 and a plurality of light shielding main plates 110b having the insertion space portion 111 and the guide portion 114.

The light shielding main plate 110b includes a body 112 formed outwardly from the lower portion of the insertion space portion 111, a tapered surface 113 formed to be inclined outwardly from the lower portion of the body 112, a plurality of assembling holes 116 of which upper and lower portions penetrate through the body 112 at predetermined intervals, and an assembling protrusion 117 formed below the assembling hole 116 and having an inner diameter of the assembling hole 116.

The light shielding upper plate 110a includes the tapered surface 113 formed to be inclined outwardly from the cover surface and the assembling protrusion 117 formed below the cover surface and having an inner diameter of the assembling hole 116, and the cover surface is formed instead of the insertion space portion 111 and thus the light shielding upper plate 110a does not include the assembling hole 116.

The assembling protrusion 117 is formed at a predetermined height to perform a ventilation function between the light shielding plates 110a and 110b and the insertion space portion 111 is formed at a lower height than the assembling protrusion 117 to perform a skirt function of preventing foreign substances from penetrating between the light shielding plates 110a and 110b. For example, the body 112 and the tapered surface 113 prevent foreign substances such as rainwater from penetrating from the upper side, and the insertion space portion 111 prevents foreign substances such as rainwater from penetrating from the lower side.

In the light shielding main plate 110b, the guide portion 114 has a guide groove formed therein to guide the insertion of the side surface of the circuit board 160.

The light shielding main plate 110b further includes a support portion 115 spaced apart from the guide portion 114 at a predetermined distance on the inner surface of the insertion space portion 111 to prevent the circuit board 160 from being separated.

The support portion 115 is formed with a support protrusion to prevent the circuit board 160 from being separated. The support portion 115 includes an H-shaped support protrusion having grooves formed at the upper and lower ends thereof and a separation prevention film at the middle end thereof. The H-shaped support protrusion prevents the circuit board 160 from being separated by inserting and fixing the upper or lower surface of the circuit board 160.

The light shielding main plate 110b is used as one of the guide portion 114 and the support portion 115 in response to an assembling angle of the circuit board 160 and a side surface length of the circuit board 160. In the plurality of stacked light shielding main plates 110b, the light upper shielding main plate and the lower light shielding main plate are used as the support portion 115 in response to the assembling angle of the circuit board 160 and the middle light shielding main plate is used as the guide portion 114 in response to the side surface length of the circuit board 160.

In the present invention, the support portion 115 is disposed at the upper and lower ends of the circuit board 160 and the guide portion 114 is disposed at the middle end of the circuit board 160, and thus the light shielding main plate 110*b* may be used as one of the guide portion 114 and the support portion 115, and the circuit board 160 having any length may be actively installed inside the light shielding portion 110.

One assembling hole 116 is axially aligned with the guide portion 114 and the other assembling hole 116 is axially aligned with the support portion 115. For example, in order to provide the assembling angle, a structure in which three assembling holes 116 are disposed is a regular triangle structure, and a structure in which four assembling holes 116 are disposed is a square structure.

Figure 6:
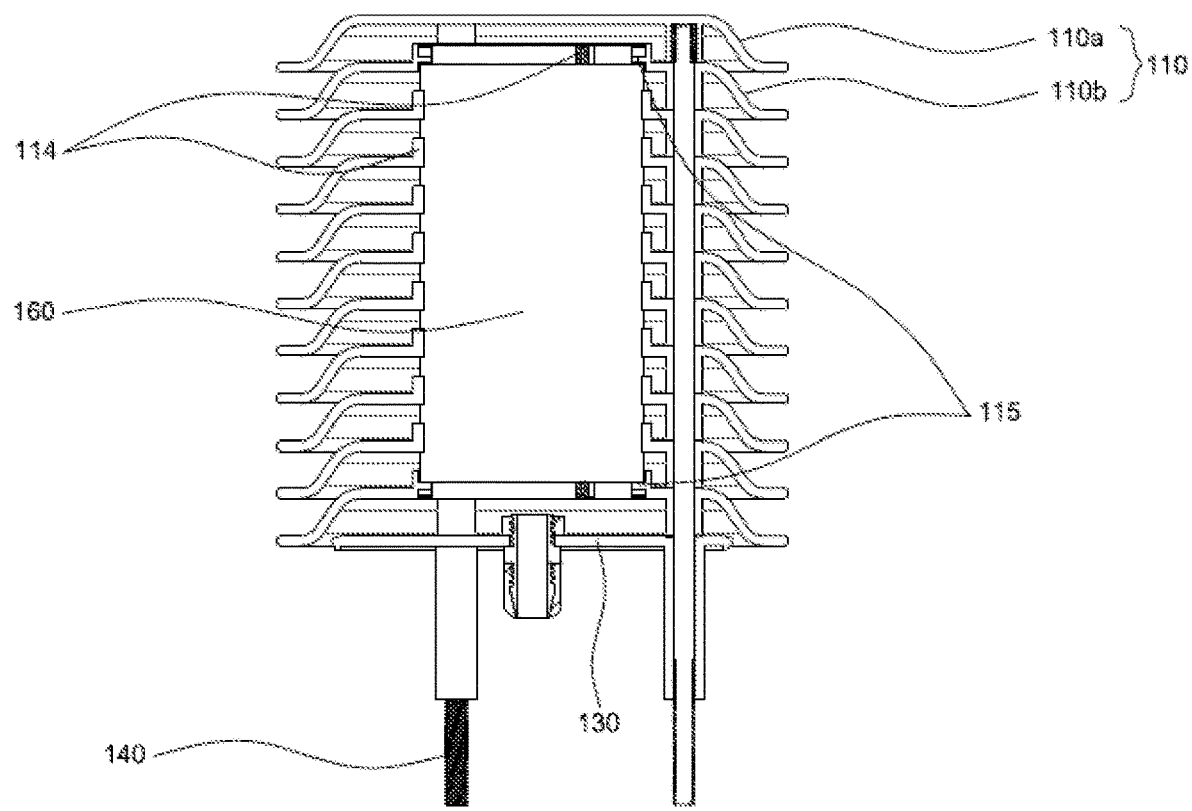
FIG. 6 shows a cross section of a part A of FIG. 2.

The circuit board 160 may have a general rectangular structure as shown in FIG. 6 and include a contact insertion portion 163 and a non-contact groove portion 164 as shown in FIGS. 7 and 8.

The contact insertion portion 163 has protruding surfaces formed at both upper and lower edges to contact the guide portion 114 when inserted into the light shielding main plate 110*b* and is seated on the support portion 115 when the insertion is completed.

The non-contact groove portion 164 has a groove formed between the protruding surfaces of the contact insertion portions 163 at the upper and lower ends thereof to prevent heat conduction of the light shielding main plate 110*b* and increase a ventilation effect between the light shielding main plates 110*b*.

What is claimed is:

1. An environmental sensor apparatus comprising:
   a light shielding portion in which a plurality of light shielding plates are stacked;
   a bracket formed below the light shielding portion to fix the light shielding portion; and
   an environmental sensor portion disposed inside the light shielding portion, and
   a circuit board which is connected in circuit with the environmental sensor portion,
   wherein the light shielding plate includes an insertion space portion providing an insertion space of the circuit board and a guide portion guiding the insertion of the circuit board to the inner surface of the insertion space portion,
   the guide portion guides the circuit board to be inserted in a longitudinal direction of the side of the circuit board, and
   the circuit board is mounted inside the light shielding portion.

2. The environmental sensor apparatus of claim 1, wherein the guide portion has a guide groove formed therein to guide insertion of the side surface of the circuit board.

3. The environmental sensor apparatus of claim 1, wherein the light shielding plate further includes a support portion which is spaced apart from the guide portion at a predetermined interval on the inner surface of the insertion space portion to prevent the circuit board from being separated.

4. The environmental sensor apparatus of claim 3, wherein the light shielding plate is used as one of the guide portion and the support portion in response to an assembling angle of the circuit board and a side surface length of the circuit board.

5. The environmental sensor apparatus of claim 3, wherein the circuit board includes
   a contact insertion portion which has protruding surfaces formed at both upper and lower edges to contact the guide portion when inserted into the light shielding plate and is seated on the support portion when the insertion is completed, and
   a non-contact groove portion which has a groove formed between the protruding surfaces of the contact insertion portions at the upper and lower ends thereof to prevent heat conduction of the light shielding plate and increase a ventilation effect between the light shielding plates.

6. The environmental sensor apparatus of claim 1, wherein the light shielding plate includes
   a body formed outwardly from the lower portion of the insertion space portion;
   a tapered surface formed to be inclined outwardly from the lower portion of the body;
   a plurality of assembling holes of which upper and lower portions penetrate through the body at predetermined intervals; and
   an assembling protrusion formed below the assembling hole and having an inner diameter of the assembling hole.

7. The environmental sensor apparatus of claim 6, wherein the assembling protrusion is formed at a predetermined height to perform a ventilation function between the light shielding plates and the insertion space portion is formed at a lower height than the assembling protrusion to perform a skirt function of preventing foreign substances from penetrating between the light shielding plates.

8. The environmental sensor apparatus of claim 1, wherein the bracket includes an insertion hole for inserting a probe, and the probe performs at least one of a function of receiving the environment sensor portion, a function of supplying external power to the circuit board, a function of supplying power of the battery attached to the circuit board to an external sensor portion, and a function of transmitting and receiving data when being connected with the external sensor portion.

* * * * *